United States Patent [19]

Lindner et al.

[11] Patent Number: 4,865,917
[45] Date of Patent: Sep. 12, 1989

[54] THERMOPLASTIC SILICONE RUBBER GRAFT POLYMERS (I)

[75] Inventors: Christian Lindner, Cologne; Herbert Eichenauer, Dormagen; Dieter Wittmann, Krefeld; Volker Damrath, Burscheid, all of Fed. Rep. of Germany

[73] Assignee: Bayer Aktiengesellschaft, Leverkusen, Fed. Rep. of Germany

[21] Appl. No.: 203,988

[22] Filed: Jun. 8, 1988

[30] Foreign Application Priority Data

Jun. 20, 1987 [DE] Fed. Rep. of Germany ....... 3720476

[51] Int. Cl.$^4$ .............................................. B32B 9/00
[52] U.S. Cl. .................................... 428/407; 428/420; 525/63; 525/69; 525/72; 525/902
[58] Field of Search ..................... 525/902, 72, 63, 69; 428/407, 420

[56] References Cited

U.S. PATENT DOCUMENTS

| | | | |
|---|---|---|---|
| 3,923,923 | 12/1975 | Fiedler | 525/63 |
| 4,341,883 | 7/1982 | Gift | 525/902 |
| 4,550,139 | 10/1985 | Arkles | 525/63 |
| 4,748,215 | 5/1988 | Lindner et al. | 525/479 |
| 4,798,869 | 1/1989 | Sturm et al. | 525/305 |

Primary Examiner—Melvyn I. Marquis
Attorney, Agent, or Firm—Connolly and Hutz

[57] ABSTRACT

Thermoplastic particulate graft polymers comprising particles of a core (A) of an organic resin-like polymer of olefinically unsaturated monomers having softening temperatures (glass temperatures) above 30° C., a shell polymer (B) or ogranopolysiloxane and a polymer (C) of at least one $\alpha,\beta$-unsaturated olefinic monomer grafted onto the particles consisting of A and B and their use as thermoplastic molding compositions.

4 Claims, No Drawings

THERMOPLASTIC SILICONE RUBBER GRAFT POLYMERS (I)

This invention relates to graft polymers on special silicone rubbers and to their use as thermoplastic molding compositions.

Graft polymers on silicone rubbers are known in principle (cf. DE-OS No. 2 539 572 and DE-OS No. 2 4212 88).

It has been found that graft polymers on silicone rubbers as the graft base form particularly advantageous thermoplastic molding compositions when the graft base has a core/shell structure in which the core may be a resin-like polymer. Accordingly, the present invention relates to thermoplastic particulate graft polymers comprising particles of a core (A) of an organic, resin-like polymer having softening temperatures (glass temperatures) above 30° C. of olefinically unsaturated monomers, a shell polymer (B) of organopolysiloxane and a polymer (C) (graft superstrates) of at least one $\alpha, \beta$-unsaturated olefinic monomer grafted onto the particles consisting of A and B.

The ratio by weight of the core (A) to the shell (B) may be from 0.1:99.9 to 90:10 and is preferably from 0:90 to 50:50. The multiphase graft polymers according to the invention have average particle diameters ($d_{50}$) of from 0.05 to 10 μm, preferably from 0.1 to 2 μm and more preferably from 0. to 1 μl.

Preferred graft polymers contain the graft superstrates (C) in quantities of 20 to 90% by weight, preferably in quantities of 30 to 80% by weight and more preferably in quantities of 45 to 75% by weight, based on the graft polymer as a whole.

The cores A of an organic, resin-like polymer having softening temperatures (glass temperatures) above 30° C. (preferably above 60° C. and more preferably above 90° C.) themselves have average particle diameters ($d_{50}$) of from 0.05 to 2 μm and preferably from 0.09 to 0.5 μm. They may be uncrosslinked, partially crosslinked or highly crosslinked, particles of uncrosslinked polymer being preferred. The core material (A) is a resin-like homopolymer or interpolymer of at least one olefinically unsaturated polymerizable monomer, more especially α-methyl styrene, acrylonitrile, methacrylonitrile, alkyl methacrylate, maleic imide, vinyl esters of $C_1$-$C_6$ carboxylic acids olefin, more especially ethylene, vinyl chloride, vinylidene chloride, acrylic acid, methacrylic acid, acrylamide or mixtures thereof.

If desired, relatively small quantities (up to 10% by weight) of butadiene, isoprene, alkylacrylate, maleic acid esters may be additionally incorporated in the polymers. Preferred core materials are copolymers based on styrene and/or α-methyl styrene with methyl methacrylate and/or acrylonitrile, more especially styrene-acrylonitrile copolymers, α-methyl styrene/acrylonitrile copolymers styrene/methyl methacrylate copolymers and polymethyl methacrylate.

The constituent material of the shell (B) is an at least partially crosslinked homopolymer or interpolymer of organosiloxanes, essentially comprising units corresponding to the following general formula

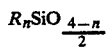  (I)

in which R is an organic radical and n is a number having an average value of 1 to less than 3.

For example, R may be a monofunctional saturated hydrocarbon radical containing from 1 to 18 carbon atoms, such as methyl, ethyl, phenyl or any other monofunctional, optionally substituted hydrocarbon radical which is reactive under the influence of reaction promoters, more especially vinyl, allyl, chloroalkyl, mercaptoalkyl, acryloxypropyl. Preferably, at least 80% of all the substituents R are methyl groups.

The graft superstrates (C) present in the graft polymers according to the invention are polymers of $\alpha,\beta$-unsaturated polymerizable monomers, preferably vinyl monomers. Suitable monomers are, for example, styrene, α-methyl styrene, p-methyl styrene, halogen styrene, acrylonitrile, methacrylonitrile, vinyl halide, maleic imides, maleic acid derivatives, vinyl acetate, vinyl propionate, alkyl (meth)acrylates (containing up to 10 carbon atoms in the alcohol part), vinyl ethers, conjugated dienes, such as butadiene, chloroprene. Particularly preferred monomers are styrene, acrylonitrile and α-olefins (for example propene, ethylene, butene).

The graft superstrates (C) may be homopolymers or, preferably, co-polymers of at least two of the above-mentioned monomers, for example styrene and acrylonitrile.

The polymers (C) are at least partly grafted onto the silicone rubber, i.e. chemically attached thereto. In particularly preferred graft polymers, more than 40% by weight of the graft overlay is actually grafted on.

The graft polymers according to the invention may be prepared as follows:

In the first step, an emulsion of the core material (A) is prepared by the dispersion polymerization known per se of one or more monomers, more especially by emulsion polymerization in aqueous medium in the presence of radical initiators and emulsifiers. The diameter of the polymer particles in the emulsion may be adjusted through the choice of the polymerization conditions. Polymerization is normally carried out at 30° C. to 100° C. Preferred emulsions of the core polymer A have a pH value below 7 and are prepared with anionic emulsifiers, more especially salts of sulfonic acids or organic sulfates. The ratio of monomer to emulsifier to water used determines the particle diameter of the polymers in the latices thus obtained. In order to obtain completely or partly crosslinked core material A, the monomers may be polymerized together with at least one polyfunctional vinyl or allyl monomer, more especially in quantities of up to 5% by weight, based on monomers. Crosslinking polyfunctional monomers are known, preference being attributed to divinylbenzene, bisacrylates, bisacrylamides, acrylic acid vinyl ester, triallyl cyanurate, isocyanurate, phosphate, citrate.

In the second step, the organopolysiloxane forming the shell (B) is prepared by emulsion polymerization in the presence of the emulsion of the polymer prepared in the first step by dispersing low molecular weight organosiloxanes in the latex from the first step and polymerizing the resulting dispersion (optionally in the presence of emulsifier in the quantity required for a stable emulsion and a catalyst). The coarsely dispersed organosiloxane does not have to be mechanically emulsified, for example in high-speed stirrers, colloid mills or high-pressure homogenizers, before the polymerization. Instead, emulsion and polymerization are preferably carried out at the same time. In this way, the organopolysiloxane formed is surprisingly polymerized onto the core material (A) prepared in the first step. In general, polymerization is carried out at 40° C. to 100° C.

The particle diameter of these core-shell polymers may also be adjusted through the choice of the polymerization conditions, for example by the use of nonionic co-emulsifiers, the ratio of emulsifier to organosiloxane and by the use of core materials having suitable particle diameters.

Organosilicon monomers and oligomers for the production of (B) are known. Suitable organosilicon monomers and oligomers include inter alia cyclic organosiloxane oligomers, for example octamethyl cyclotetrasiloxane and decamethyl cyclopentasiloxane. In addition, it is possible to use alkoxysilanes and alkoxysiloxanes containing 1 to 4 carbon atoms in the alkoxy group. Examples include methyl triethoxysilane, 3-aminopropyl trimethoxysilane and 3-mercaptopropyl methyl dimethoxysilane. Also suitable are polysiloxanols, particularly $\alpha,\omega$-polysiloxane diols having molecular weights of around 2,000 to 5,000 and a viscosity of 50 to 150 mPa.s at 25° C.

The organopolysiloxane of the shell (B) may be partly crosslinked. Branches or crosslinks may be incoporated through the co-use of, for example, tetraethoxysilane or of a silane corresponding to the following general formula $$RSiX_3$$
(II)

in which X is a hydrolyzable group, more expecially the alkoxy radical, and R is as defined above. R is preferably methyl and phenyl. However, crosslinking may also occur if, for example, vinyl and mercapto groups used at the same time react with one another in the emulsion polymerization of the siloxane constituents In that case, there is no need to add an external crosslinking agent.

The emulsifiers used are known non-ionic and/or anionic emulsifiers.

Examples of nonionic emulsifiers are adducts of ethylene oxide with compounds containing acidic hydrogen, such as fatty alcohols and fatty acids. The HLB value of the emulsifiers should be in the range which promotes the formation of o/w emulsions, generally $\geq 10$. Suitable nonionic emulsifiers are, for example, POE (3)-lauryl alcohol, POS (20)-oleyl alcohol, POE (7)-nonylphenol and POE (10)-stearate. (The notation POE (3)-lauryl alcohol e.g. means that 3 units of ethylen oxide are added onto 1 molecule of lauryl alcohol, the number 3 representing an average value; the other products are defined in an analogous manner).

Suitable anionic emulsifiers are the alkali salts of fatty acids or the alkali, alkaline earth or amine salts of organic sulfonic acids, more especially alkylaryl sulfonic acids. Examples include the sodium salts of dodecyl benzenesulfonic acid and lauryl sulfonic acid. Mixtures of nonionic emulsifiers and anionic emulsifiers may be used.

Acids, preferably surface-active acids, are used as the catalysts. Examples include sulfonic acids, such as alkyl sulfonic acids and alkylaryl sulfonic acids, particularly dodecyl benzenesulfonic acid.

In the polymerization of the shell (B) onto the core (A), the formation of new particles must be completely prevented. Accordingly, the emulsifier may only be present in a quantity just sufficient to cover the surface of the particles. If an agglomerated latex is used for forming the core (A) in order to obtain a graft polymer comprising large particles, this graft polymer may contain ungrafted resin particles. The polymerization of the shell (B) may also be conducted in such a way that particles of pure organopolysiloxane are formed in addition to the core-shell particles. In special circumstances, it is possible to use mixtures of both kinds.

In the third step of the production process, the monomers forming the graft superstrates are radical initiated polymerized in the presence of the graft polymer of the second step, more especially at 40° C. to 90° C., resulting in the formation of a second graft shell (graft superstrates). This graft polymerization can be carried out in suspension, dispersion or preferably in emulsion, continuously or in batches. The polymerization is initiated by radical formers (such as peroxides, azo compounds, hydroperoxides, persulfates, perphosphates), anionic emulsifiers, such as carbonium salts, sulfonic acid salts or organic sulfates, optionally being used. The graft polymers are formed in high graft yields, i.e. a large part of the polymer (C) formed is chemically attached to the silicone rubber. The graft polymer of the second step (A+B) eliminates the need for special process measures to obtain high graft yields.

The resulting graft polymers of the third step can be processed by known methods, for example by coagulation of the latices with electrolytes (salts, acids or mixtures thereof), followed by purification and drying The graft polymers according to the invention have surprisingly good properties as thermoplasts, for example ageing stability, thermal stability, particularly during processing into moldings, surface quality of moldings produced therefrom, processibility, toughness at low temperatures and break resistance.

The graft polymer according to the invention can be directly used as a thermoplastic molding composition if its rubber content (i.e. graft polymer of A and B) is not greater than 40% by weight. When the rubber content is higher, a rigid resin is preferably added. Rigid resins are, preferably, styrene/methyl methacrylate/acrylonitrile terpolymers, styrene or α-methyl styrene/acrylonitrile copolymers, styrene/acrylonitrile/acrylate terpolymers, methyl methacrylate homopolymers and copolymers, styrene/maleic anhydride copolymers, styrene/methyl methacrylate/maleic anhydride terpolymers or mixtures of such resins.

The graft polymers according to the invention can also be mixed with known rubber-modified plastics, for example ABS plastics, or with acrylate-rubber-modified resins ("ASA resins"). It is thus possible to improve the ageing resistance and electrostatic properties of ABS plastics without adversely affecting their mechanical properties or to improve the mechanical properties of ABS resins and the surface quality of moldings produced therefrom.

The graft polymers according to the invention as part of the molding compositions can contain dyes and pigments, light and heat stabilizers, plasticizers, blowing agents and organic or inorganic fillers in granule, powder or fiber form. They can be molded, for example, by or by extrusion and are suitable for molded articles of all kinds which are required to be weather-resistant and impact-resistant. For example, they can form the outer layer of a laminate of several different polymers.

EXAMPLES

1. Preparation of a core material (A)

1.1 3,000 parts by weight water and 7.5 parts by weight of the Na salt of $C_{14}$–$C_{18}$ alkyl sulfonic acids are introduced into a reactor after heating with stirring to 63° C. to 65° C., 240 parts by weight of a mixture of 28% by weight acrylonitrile and 72% by weight styrene are introduced into the reactor. After initiation with a solution of 15 parts by weight potassium peroxodisulfate in 150 parts by weight water, the following solutions are introduced into the reactor over a period of 4 hours:

Solution 1

788 parts by weight acrylonitrile
2025 parts by weight styrene
12 parts by weight tert.-dodecyl mercaptan Solution 2

2100 parts by weight water
33 parts by weight Na salt of $C_{14}$–$C_{18}$ alkyl sulfonic acids.

Polymerization is then carried out at 65° C. until the latex has a solids content of greater than 36.5% by weight. The resulting latex has a pH value of 3.57 and an average particle diameter ($d_{50}$ value) of 0.12 μm.

2. Preparation of rubber particles (A+B)

2.1 The following constituents are introduced under nitrogen into a reactor:
150 parts by weight of the resin emulsion (1.1)
5.0 parts by weight octamethyl cyclotetrasiloxane The reaction mixture is heated to 85° C. and stirred for 2 hours.

After the addition of a solution of 1.4 parts by weight dodecyl benzenesulfonic acid, 1.4 parts by weight POE (5)-lauryl alcohol and 1.4 parts by weight $C_{12}$–$C_{14}$ alkyl sulfonic acid sodium salt in 58 parts by weight water, the mixture is stirred for 1 hour at 80° C. A mixture of 95 parts by weight octamethyl cyclotetrasiloxane, 2.5 parts by weight mercaptopropyl methyl dimethoxysilane and 3.1 parts by weight tetraethyl tetravinyl cyclotetrasiloxane is then added over a period of 2 hours, polymerization is completed over a period of 23 hours at 80° C. and the stable emulsion formed is cooled to room temperature. It contains the multiphase polymer in a concentration of 48.7% by weight. The mean particle diameter is 0.18 μm. The polymer is partly crosslinked and has a gel content of 58.2%. It consists of 35% by weight styrene/acrylonitrile copolymer and 65% by weight organosiloxane.

3. Graft polymer according to the invention (A+B+C)

3.The following constituents are introduced into a reactor:
1540 parts by weight latex 2.1
1640 parts by weight water After initiation with a solution of 7.5 parts by weight potassium peroxodisulfate in 195 parts by weight water at 65° C., the following solutions are uniformly introduced into the reactor over a period of 4 hours:

Solution 1

540 parts by weight styrene
210 parts by weight acrylonitrile

Solution 2

375 parts water
15 parts by weight sodium salt of $C_{14}$–$C_{18}$ alkyl sulfonic acids.

Polymerization is then carried out over a period of 4 hours at 65° C. The monomer conversion is more than 98% by weight. A latex having a solids content of approximately 33% by weight is obtained. After coagulation with an aqueous magnesium sulfate solution, filtration and drying in vacuo, the graft polymer is obtained in the form of a white powder.

4. Comparison 4.1 Preparation of a silicon emulsion 38.4 parts by weight octamethyl cyclotetrasiloxane, 1.2 parts by weight tetramethyl tetravinyl cyclotetrasiloxane and 1 part by weight γ-mercaptopropyl methyl dimethoxysilane are stirred with one another 58.4 parts by weight water are then added over a period of 1 hour with intensive stirring to 0.5 part by weight dodecyl benzenesulfonic acid. The pre-emulsion is homogenized twice at 200 bar in a high-pressure emulsifying machine. Another 0.5 part by weight dodecyl benzenesulfonic acid is then added.

The emulsion is stirred for 2 hours at 85° C. and then for 36 hours at room temperature. After neutralization with 5 N NaOH, a stable emulsion having a solids content of approximately 36% by weight is obtained. The polymer has a gel content of 82% by weight, as measured in toluene, and an average particle diameter ($d_{50}$) of 300 nm.

4.2 Graft polymer

The following constituents are introduced into a reactor:
2107 parts by weight latex 4.1
1073 parts by weight water.

After initiation with a solution of 7.5 parts by weight potassium peroxydisulfate in 195 parts by weight water, the following solutions are uniformly introduced into the reactor over a period of 4 hours at 65° C.:

Solution 1

540 parts by weight styrene
210 parts by weight acrylonitrile

Solution 2

375 parts by weight water
5 parts by weight Na salt of $C_{14}$–$C_{18}$ alkyl sulfonic acids.

Polymerization is then carried out over a period of 4 hours at 65° C., giving a latex having a solids content of approximately 33% by weight. After coagulation with an aqueous magnesium sulfate solution, filtration and drying, the graft polymer is obtained in the form of a white powder 5. Properties of the thermoplast The molding compositions shown in Table 1 are prepared by compounding in a BR Banbury mixer (Pomini-Farrel) under the following mixing conditions:
melt temperature: 190° C. to 225° C.
mixing times: 1.5 to 2 minutes
cycle times: 2 to 4 minutes The mixture drops from the Banbury mixer onto a two-roll stand (roll 1 T=160° C., roll 2 T=150° C.), is removed in the form of a ribbon and granulated after cooling.

Standard small test bars are made from the granulate by injection molding at 240° C. and tested by DIN methods.

An ABS graft polymer V of 50% by weight coarse highly crosslinked particulate polybutadiene and 50% by weight "SAN" polymer, in which the styrene-to-acrylonitrile ratio by weight is 72:28 and which has an average particle diameter (d$_{50}$) of 400 nm, is used for comparison.

The notched impact strength was determined at room temperature ($a_k{}^{RT}$) and at $-40°$ C.($a_k{}^{-40°\ C.}$) in accordance with DIN 53 (units: kJ/m$^2$), ball indentation hardness (H$_c$) in accordance with DIN 53 456 (units N/mm$^2$) and deflection temperature under load (Vicat B) in accordance with DIN 53 460 (units ° C.).

TABLE 1

| Example | Graft polymer | (Parts by weight) | Resin | (Parts by weight) | Lubricant |
|---------|---------------|-------------------|-------|-------------------|-----------|
| 5.1 | 3.1 | (20) | SAN | (80) | 2 PETS |
| 5.2 | 3.1 | (30) | SAN | (70) | 2 PETS |
| 5.3 | 3.1 | (40) | SAN | (60) | 2 PETS |
| 5.4 | 3.1 | (50) | SAN | (50) | 2 PETS |
| 5.5 | 4.2 | (20) | SAN | (80) | 2 PETS |
| 5.6 | 4.2 | (30) | SAN | (70) | 2 PETS |
| 5.7 | 4.2 | (40) | SAN | (60) | 2 PETS |
| 5.8 | 4.2 | (50) | SAN | (50) | 2 PETS |
| 5.9 | V | (30) | SAN | (70) | 2 PETS |
| 5.10 | V | (40) | SAN | (60) | 2 PETS |
| 5.11 | V | (50) | SAN | (50) | 2 PETS |

SAN = Copolymer of 70% by weight styrene and 30% by weight acrylonitrile, limiting viscosity number [$\eta$] = 0.72 dl/g (as measured in dimethyl-formamide at 20° C.)
PETS = Pentaerythritol tetrastearate

TABLE 2

Properties of the molding compositions of Table 1

| Product | $a_k{}^{RT}$ | $a_k{}^{-40°\ C.}$ | Hc | Vicat B |
|---------|------|------|-----|---------|
| 5.1 | 10.0 | 4.0 | 125 | 104 |
| 5.2 | 17.9 | 7.9 | 109 | 101 |
| 5.3 | 20.5 | 11.5 | 100 | 99 |
| 5.4 | 22.0 | 13.6 | 78 | 98 |
| 5.5 | 11.2 | 4.0 | 123 | 102 |
| 5.6 | 16.6 | 8.2 | 103 | 100 |
| 5.7 | 18.4 | 10.9 | 97 | 99 |
| 5.8 | 19.9 | 12.9 | 69 | 93 |
| 5.9 | 14.4 | 7.2 | 108 | 99 |
| 5.10 | 14.9 | 11.2 | 90 | 98 |
| 5.11 | 15.8 | 13.1 | 74 | 95 |

We claim:

1. A thermoplastic particulate graft polymer comprising particles of a core (A) of an organic polymer of olefinically unsaturated monomers having glass temperatures above 30° C., a shell polymer (B) of organopolysiloxane and a polymer (C) of at least one $\alpha,\beta$,-unsaturated olefinic monomer grafted onto the particles consisting of A and B.

2. A polymer according to claim 1, in which the ratio by weight of the core (A) to the shell (B) is from 0.1:99.9 to 90:10.

3. A polymer according to claim 1, in which the graft superstrates (C) is present in a quantity of from 20 to 90 % by weight based on the graft polymer as a whole.

4. A polymer according to claim 1, in which the constituent material of the shell (B) is an at least partially crosslinked homopolymer or co-polymer of organosiloxanes, essentially comprising units corresponding to the following general formula $$R_n SiO_{\frac{4-n}{2}} \tag{I}$$

in which R is an organic radical and n is number having an average value of 1 to less than 3.

* * * * *